United States Patent Office 3,084,165
Patented Apr. 2, 1963

3,084,165
QUINONE DERIVATIVES AND PROCESSES FOR PRODUCING THE SAME
Carl-Wolfgang Schellhammer and Siegfried Petersen, both of Leverkusen, and Gerhard Domagk, Wuppertal-Elberfeld, Germany, assignors to Farbenfabriken Bayer Aktiengesellschaft, Leverkusen, Germany, a corporation of Germany
No Drawing. Filed May 19, 1960, Ser. No. 30,098
Claims priority, application Germany May 21, 1959
8 Claims. (Cl. 260—287)

The present invention relates in general to new organic compounds and to processes for producing the same. More particularly, the invention involves the provision of novel polynuclear quinone derivatives which have been found to be highly effective tuberculostatic agents and efficacious in inhibiting aerobic glycolysis; as well as novel intermediates and processes prepared and employed in the production thereof.

The novel compounds of the invention may be represented by the following general formulae:

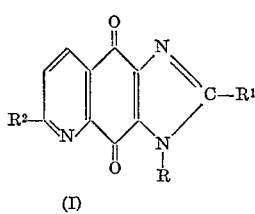 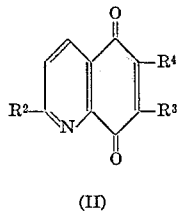

(I)  (II)

wherein R is hydrogen or an aryl radical, e.g. an unsubstituted phenyl radical, an alkoxy phenyl radical containing normally 1 to 6 carbon atoms in the alkoxy group, or an alkyl or dialkylamino substituted phenyl radical wherein the alkyl substituents contain 1 to 6 carbon atoms; $R^1$ is an alkyl radical, preferably a lower alkyl radical of 1 to 6 carbon atoms; an aryl radical, e.g. an unsubstituted phenyl radical, a phenyl radical containing hydroxy and/or alkoxy radicals, the latter group containing 1 to 6 carbon atoms therein; or a heterocyclic radical composed of five or six-membered rings and four or five carbon atoms positioned in said ring; each of the $R^2$ substituents is either hydrogen or an alkyl radical, and when the latter, preferably a lower alkyl radical; $R^3$ is an amino or substituted amino group, the latter group when present normally being an anilido radical; an alkyl amino group, again the alkyl moiety is normally lower alkyl in the latter group; an alkoxy radical containing 1 to 6 carbon atoms, or a cycloaliphatic, aromatic or heterocyclic radical; and $R^4$ is an amino radical or an acylamino radical wherein the acyl moiety contains preferably from 1 to 6 carbon atoms.

The preparation of these compounds of the present invention involves a variety of syntheses. Thus, illustratively, the production of the novel diaminoquinolinequinones encompassed by the general formula above, as well as diamino napthoquinones both of which are embraced by the following structural formula:

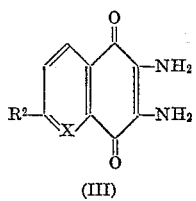

(III)

wherein $R^2$ has the meaning ascribed to it above; and X is a member of the group consisting of a nitrogen atom and a monohydrogen substituted carbon moiety; is effected by reduction of diazido quinolinequinones and diazidonaphthoquinones represented by the formula:

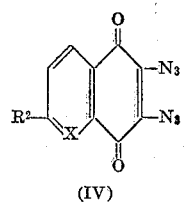

(IV)

wherein each of $R^2$ and X has the same meaning as that given above; to form the corresponding diaminohydroquinones and sequentially oxidizing the latter compounds to the corresponding novel diaminoquinolinequinones and the corresponding naphthoquinones.

It is noted that the preparation of 2,3-diamino-1,4-naphthoquinone has been suggested heretofore by splitting of the acetyl group of 2-acetamino-3-amino-1,4-naphthoquinone (Berichte der Deutschen Chemischen Gesellschaft, 1957, vol. 90, page 1145, Neef, R., Bayer, O.). This procedure, however, requires a substantial series of reaction steps, the initial reactant being 2,3-dichloro-1,4-napthoquinone, with the difficulties inherent therein.

As described hereinabove the dinuclear diamino-p-quinones, e.g. the diamino-p-naphthoquinones and diaminoquinolinequinones are prepared from the corresponding diazidonaphthoquinones and diazidoquinolinequinones respectively, in a two-step procedure of reduction and sequential oxidation. These diazidoquinones are prepared characteristically from the corresponding dichloro quinones by reaction thereof with hydrazoic acid. Thus, by way of illustration, 2,3-dichloro-1,4-naphthoquinone when reacted with solutions of salts of hydrazoic acid forms 2,3-diazido-1,4-naphthoquinone as described by K. Fries and P. Ochwat in the Berichte der Deutschen Chemischen Gesellschaft, 1923, vol. 56, p. 1299. Since, with diazidoquinones, one is concerned with high-energy compounds, it is desirable in preparing the herein described diaminoquinones to employ the diazidoquinones for this purpose while they are still in a moist state or condition.

The reduction of the diazidoquinones can be effected by addition thereof, illustratively, to an alkaline sodium dithionite solution, or catalytically. While the temperature employed is not critical, the reduction is accompanied by the evolution of nitrogen and it is therefore advisable to conduct the operation at temperatures below 60° C. to avoid an excessively violent reaction. The oxidation of the reduced products, the diaminohydroquinones can be effected simply by blowing air into the reduction solution.

The products corresponding to Formula III above resulting from this process are crystalline and are soluble in concentrated acids or caustic alkali solutions and in polar solvents. They are valuable as intermediates in the production of dyes and medicinals. The diaminoquinolinequinones are particularly valuable as intermediates in the preparation of further valuable intermediates and in the production of the tuberculostatic imidazolequinolinequinones, the preparation of which is described hereinafter.

It has been found that these latter compounds, 8-aza-(lin. naphthimidazole)-4,9-quinones substituted at least in the 2-position of the cyclized imidazole ring, can be produced by reaction of the corresponding 6,7-diamino-5,8-quinolinequinones as described hereinabove and defined generically in Formula III with an aldehyde and normally an aromatic or heterocyclic aldehydes which may be represented by the formula, $R^5$CHO wherein $R^5$ is an aromatic or heterocyclic grouping to form the corresponding hydroquinones of the reactants; and oxidizing the hydroquinones to the desired imidazolequinones.

Illustrative of the aldehydes for use herein are benzaldehyde, o-vanillin, furfural and the pyridine aldehydes, such as pyridine-4-aldehyde.

The imidazolequinones thus produced may be represented by the formula:

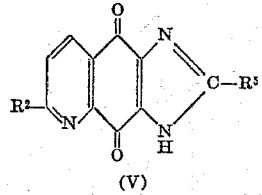

(V)

wherein $R^2$ is hydrogen or an alkyl radical as described with relation to Formula I above; and $R^5$ is an aryl or heterocyclic radical.

The reaction is most desirably performed with equivalent molar proportions of the reactants, which are heated to a temperature within the range of 70° C. to 100° C. at a pH within the range of 5 to 6. While the reaction medium is not critical an aqueous, or aqueous-alcoholic solution or a suitable suspension of the reactants may be employed. While not wishing to be limited to any theory of operation, the process would appear to proceed with initial reaction of each mole of aldehyde with a single amino group of the quinone starting material, with the resulting formation of Schiff base. The second amino group then appears to add itself to the carbon-nitrogen double bond with formation of an imidazoline. The imidazoline is next dehydrogenated in an internal redox reaction to the corresponding imidazole, with formation of the corresponding hydroquinone. The hydroquinone is then oxidized, preferably with air, to the corresponding 8 - aza-(lin. naphthimidazole)-4,9-quinone. These products are obtained in the form of red or yellow crystals which are readily soluble in organic solvents, but slightly soluble in water. In concentrations of 1:100,000 to 1:1 million they prevent the growth of normally sensitive tubercle bacilli and those strains which are resistant to p-aminosalicyclic acid, isonicotinic acid hydrazide, thiosemicarbazones or streptomycin, or simultaneously to several of the aforesaid antibiotics and therapeutic agents employed characteristically in treatment of tuberculosis. Illustratively, 2 - (2'-furyl)-8-aza-(lin. naphthimidazole)-4,9-quinone prevents growth of the all strains of tubercle bacilli with which it was brought in contact in concentrations of 1:100,000 in vitro. These therapeutically useful compounds may be employed alone or in mixtures with other pharmaceuticals. Under certain circumstances, they may be similarly employed in the form of their corresponding acylated hydroquinones.

It has also been found that the novel 5,8-quinolinequinones embraced by the general Formula II above and further defined by the formula:

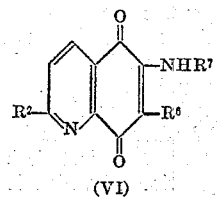

(VI)

wherein $R^2$ is hydrogen or an alkyl radical as defined above; $R^6$ is an amino group, or a monovalent substituted amino radical derived from a primary or secondary amine; and $R^7$ is an acyl group; are formed by reacting a 6-acylamino-5,8-quinolinequinone, further substituted in the 7-position of the quinone nucleus, by a halogen, alkoxy or alkylmercapto moiety with ammonia or a suitable amine.

Thus, the reactant 6-acylamino-5,8-quinolinequinone employed as a starting material may be defined by the formula:

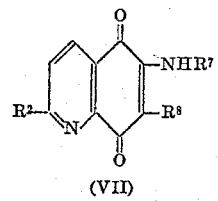

(VII)

wherein each of $R^2$ and $R^7$ has the same meaning as that assigned to it above in Formula VI; and $R^8$ is a halogen atom, an alkoxy radical or an alkylmercapto radical. The amine reactant may be ammonia, or a primary or secondry aliphatic or aromatic amine. Illustrative primary and secondary amines are methylamine, dimethylamine, piperidine, morpholine, cyclohexylamine, aniline, 2-amino anisole or N-methyl aniline.

The mechanism of the instant reaction may be best illustrated by the following schematic presentation in which 6-acetamino-7-chloro-5,8-quinolinequinone is reacted with ammonia:

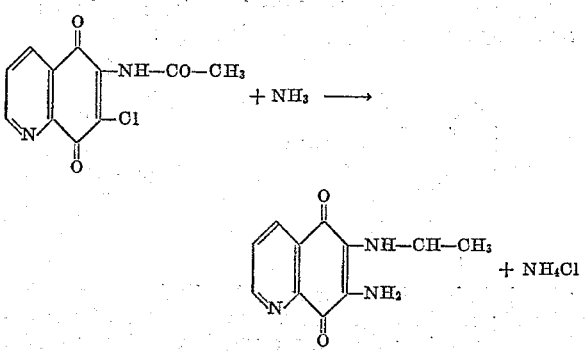

The preparation of the 6-acylamino-5,8-quinolinequinones substituted in the 7-carbon position by a halogen or alkylmercapto group, in the manner described in Formula VII above, has been known heretofore. The corresponding 6-acylamino-7-alkoxy substituted compounds are prepared by reaction of the 6-acylamino-7-halogen-5,8-quinolinequinones by standard techniques with alkali metal alcoholates or by alkylation with diazoalkanes, again by standard procedures, of 6-acylamino-7-hydroxyl-5,8-quinolinequinones.

The preparation of the final products, embraced by Formulae II and VI above, is effected by reaction of the 6-acylamino-5,8-quinolinequinone substituted by a halogen, alkyl mercapto or alkoxy group at the 7-carbon position with the amine or ammonia in a suitable non-reactive organic solvent, such as, for example, alcohol, xylene, chlorobenzene or nitrobenzene at a temperature in the range of room temperature or approximately 25° C. and the boiling temperature of the solvent employed. Where the quinone starting material is a 6-acylamino-5,8-quinolinequinone substituted in the 7-carbon position by an alkoxy or alkylmercapto radical, only one mole equivalent of amine or ammonia is required for complete conversion of the reactant quinone; whereas when 6-acylamino-7-halogen-5,8-quinolinequinones are used, 2 moles of the amine for each mole of quinone are used to effect substantially complete utilization and conversion of quinone. Alternatively, this latter reaction can be carried out with one mole of the amine in the presence, additionally, of a suitable acid acceptor.

The products of this reaction appear generally in the form of red or reddish-brown crystalline substances which are slightly soluble in water and substantially soluble in most organic solvents. In a state of high dilution these compounds, the 6-acylamino-5,8-quinolinequinones having an amino substituent at the 7-carbon position, are active tuberculo-static agents and are also active in preventing the growth of other causative agents of infectious diseases. Illustratively, 6-acetylamino-7-amino-5,8-quinolinequinone has been shown to prevent the growth of tubercule bacilli in vitro at the following concentrations: H 37 Rv 1:500,000-1:1 million, RS 57 1:100,000, RS 262 1:1 million, RS 125 1:10 millions, <1 million. The permitted maximum dosage for this same compound was indicated to be 2 mg./kg. Again, with 6-propionyl-amino-7-amino-5,8-quinolinequinone the concentration values in vitro resulting in inhibition of all strains of tubercle bacillus growth were 1:1 million and 1:100,000-1:200,000. A permitted maximum dosage of 2 mg./kg. was indicated. Similar tests were performed with 6-benzoylamino-7-amino quinolinequinone yielding growth-inhibitory concentration test values in vitro against strains of tubercle bacillus of H 37 Rv>1:1 million, RS 262 1:1 million, RS 125 1:50 millions; and 1:200,000-1:400,000. The permitted maximum dosage was 2 mg./kg. Further, these compounds have been found to suppress in very low concentrations the aerobic glycolysis of tumor cells and can be used as therapeutic agents alone or in mixture with other substances suitable to serve as pharmaceuticals. It is noted that these compounds are also useful, therapeutically, in these respects in the form of their corresponding acylated hydroquinones, as well. In addition, they have significant utility as intermediates for use in the preparation of certain 8-aza-(lin. naphthimidazole)-4,9-quinones encompassed generically in Formula I above.

Thus, it has been found that derivatives of 8-aza-(lin. naphthimidazole)-4,9-quinones further substituted in the heterocyclic ring can be obtained by heating the corresponding 6-acylamino - 7 - amino-5,8 - quinolinequinones which may be further substituted in the amino radical attached to the 7-carbon position of the quinone nucleus; that is, compounds, of the class included in Formula II and further defined in Formula VI above. When, in this case, the starting material used is a 6-acylamino-7-amino-5,8-quinolinequinone there will be obtained an 8-aza-(lin. naphthimidazole)-4,9-quinone substituted in the 2-carbon position only. When the reaction is initiated with a 6-acylamino-7-amino-5,8-quinolinequinone wherein the amino moiety attached to the 7-carbon constituent is substituted with a hydrocarbon radical e.g. alkyl and aryl substituent, the end-product will be substituted in the positions 1 and 2. These end-products are embraced by Formula I above. They may be further represented by the following general formula:

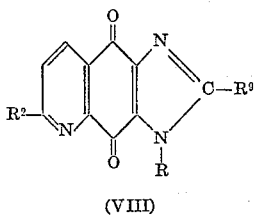

(VIII)

wherein R is a hydrogen atom or an aryl radical; $R^2$ is a hydrogen atom or an alkyl radical; and $R^9$ is an alkyl radical.

Appropriate acyl substituents for attachment to the amino moiety substituted at the 6-carbon position of the quinone starting material, that is the intermediate compounds defined in Formula VI above, are the radicals of aliphatic, cycloaliphatic, aromatic and heterocyclic carboxylic acids, such as for example, the acetyl, propionyl, hexahydrobenzoyl, benzoyl and furyl radicals. Suitable substituents in the amino radical attached to the 7 position of the quinone nucleus of the starting material are, for example, methyl, ethyl, 3-dimethyl-aminopropyl, phenyl, dimethylaminophenyl and alkoxyphenyl (e.g. methoxy phenyl) groups.

The cyclization of a suitable reactant starting material as defined in Formula VI above is brought about by heating thereof, most desirably, in water or water-alcohol in the presence of hydroxyl ions to a temperature within the range of from 50° C. to 100° C. Depending on the temperature used within this range, the time required for the reaction will vary between a few minutes and several hours. It will be apparent therefore that time does not constitute a narrowly critical factor. The required hydroxyl ion concentration is obtained through the addition of an alkali metal hydroxide, such as, for example, potassium hydroxide or sodium hydroxide.

It is noted that in preparing the imidazolequinoline-quinones of Formula VIII above and specifically those members thereof resulting from reaction of 6-acylamino-5,8-quinolinequinones further substituted at the 7 position of the quinone nucleus by ammonia or a monovalent substituted amino radical derived from a primary amine; that is quinone materials as defined in Formula VI above wherein $R^5$ is ammonia or a monovalent radical derived from a primary amine, e.g. an aromatic or aliphatic amine; one may proceed with the preparation of these 6-acylamino-5,8-quinolinequinones as described hereinabove and without separation from the reaction mixture thereafter proceed with the production of the imidazole-quinolinequinones by the method also described hereinabove. Thus, one may react a suitable 6-acyl-amino-5,8-quinolinequinone as defined in Formula VII above wherein $R^7$, the substituent attached to the 7 position of the quinone nucleus, is a halogen atom, in a suitable medium such as water, water-alcohol or alcohol with an amine whereupon, without isolation of the 6-acylamino-7-amino intermediate compound, cyclization thereof is effected by heating thereof at the desired range (i.e. 50° C. to 100° C.) in the presence of an alkali metal hydroxide for the requisite period.

From the reaction mixture, subsequent to cyclization, there is obtained, after adjustment of the pH to 5 to 7, imidazolequinolinequinones unsubstituted in the 1-position of the cyclized nucleus and encompassed by the Formulae I and VIII above wherein R is solely hydrogen, as these compounds are alkali-soluble due to the acid hydrogen atom present in the 1 position.

The products, the compounds of Formula VIII above, resulting from this process are obtained normally in the form of red to yellow crystals soluble in organic solvents and also soluble slightly in water. These compounds prevent the growth of normally sensitive tubercle bacilli and those resistant to p-aminosalicylic acid, isonicotinic acid hydrazide, thiosemicarbazone or streptomycin, in dilutions of 1:100,000 to 1:1 million.

This activity is particularly striking as the 2-methyl-(lin. naphthimidazole)-4,9-quinone suggested by J. R. E. Hoover and A. R. Day in the Journal of the American Chemical Society, vol. 76, p. 4150 (1954) is substantially and significantly ineffective in this respect. Thus, by way of illustration, 2-methyl-(lin. naphthimidazole)-4,9-quinone prevents the growth of the tubercle bacillus strain H 37 Rv in vitro only in concentrations of 1:10,000 and with the strain RS 125 resistant to isonicotinic acid hydrazide and thiosemicarbazones, in concentrations of 1:25,000. This same compound evidenced no measurable effectiveness in inhibiting the growth of isonicotinic acid hydrazide-resistant tubercle bacilli of strain 262. With 2-methyl - 8 - aza-(lin. naphthimidazole)-4,9-quinone, a compound of the present invention, the growth of tubercle bacilli of the strain H 37 Rv is prevented at concentrations of less than and including 1:100,000, and with the strains 262, resistant to isonicotinic acid hydrazide, and RS 125 resistant, as noted above, to both isonicotinic acid hydrazide and thiosemicarbazones, growth is prevented in concentrations of 1:1 million. The permitted maximum dosage of the latter compound is 2 mg./kg.

The products of Formula VIII, as those others described hereinabove having a significant therapeutic activity, can be used pharmacologically and in therapy either alone or in mixture with other suitable pharmaceutical compounds. They can also be used in the form of the acylated hydroquinones.

It is believed that the invention may be best understood by reference to the following specific examples illustrating the application of the foregoing principles and procedures to the preparation of typical compounds of the invention.

*Example 1*

Preparation of the compound 2,3-diamino-1,4-napthoquinone as represented by the formula:

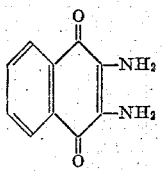

2,3-diazido-1,4-naphthoquinone prepared from 2.27 grams of 2,3-dichloro-1,4-naphthoquinone and 1.5 grams of sodium azide according to the procedure described in Berichte der Deutsch. Chem. Gesellschaft, vol. 56, p. 1299 (1923) was added while in a moist state to a solution of 6 grams of sodium dithionite and 2 grams of sodium hydroxide in 50 cubic centimeters (cc.) of water. Simultaneously, there was formed, with a brisk evolution of nitrogen, a colorless solution from which blue crystals were precipitated on blowing of air thereinto. 2,3-diamino-1,4-naphthoquinone, the desired product, soluble in alcohol with a reddish-blue color; a blue color in pyridine; and a yellow color in concentrated sulfuric acid resulted. This product evidenced no characteristic decomposition temperature. Its corresponding acetyl derivative formed by conventional acetylation procedure was found to have a melting point of 233° C.

*Example 2*

Preparation of the compound 6,7-diamino-5,8-quinolinequinone, as represented by the formula:

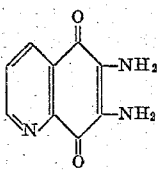

6,7-diazido-5,8-quinolinequinone, red crystals, having a melting point of 108° C. (decomposition) and prepared from 45 grams of 6,7-dichloro-5,8-quinolinequinone and 30 grams of sodium azide were added in portions to a mixture of 1 liter of water, 120 grams of sodium dithionite and 100 cc. of a 45 percent aqueous caustic soda solution, at a temperature of about 30° C. Simultaneously with the vigorous evolution of nitrogen, a brownish-yellow solution was formed from which, on blowing air thereinto, 35 grams of 6,7-diamino-5,8-quinolinequinone precipitated in the form of small crystals which undergo decomposition at 160° C. The corresponding acetyl derivative thereof prepared by standard acetylation procedure was found to have a melting point of 233° C.

*Example 3*

Preparation of the compound 6,7-diamino-5,8-quinaldinequinone, as represented by the formula:

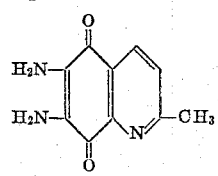

6,7-diazido-5,8-quinaldinequinone (red crystals, melting point 106° C., decomposition) prepared from 16 grams of 6,7-dichloro-5,8-quinaldinequinone and 9.5 grams of sodium azide was added to a mixture prepared from 350 cc. of water, 45 grams of sodium dithionite and 30 cc. of a 45% aqueous caustic soda solution. A brisk evolution of nitrogen resulted. A strong current of air was then directed into the solution, with external cooling by water thereof, and precipitation of 10 grams of the desired product, 6,7-diamino-5,8-quinaldine in the form of blue crystals therefrom. This latter product was found to decompose at 140° C. Its corresponding acetyl derivative had a melting point of 206° C.

*Example 4*

Preparation of the compound 6-acetamino-7-amino-5,8-quinolinequinone, as represented by the formula:

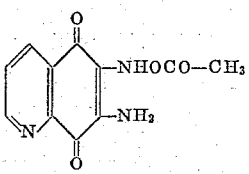

Into a solution of 12 grams of 6-acetamino-7-chloro-5,8-quinolinequinone in 75 cc. of nitrobenzene, ammonia was admitted during a period of 75 minutes at a temperature of 140° C. While still hot, the precipitated ammonium chloride was separated by suction filtration, and the red crystals separated on cooling from the mother liquor, recrystallized from xylene. The desired product, 6-acetamino-7-amino-5,8-quinolinequinone, of which 8 grams were obtained, melted at 233° C. In an analogous manner, 6 - acetamino - 7 - chloro-5,8-quinaldinequinone when reacted with ammonia has been found to yield 6-acetamino, 7-amino-5,8-quinaldinequinone.

*Example 5*

Preparation of the compound 6-acetamino-7-methyl-amino-5,8-quinolinequinone, as represented by the formula:

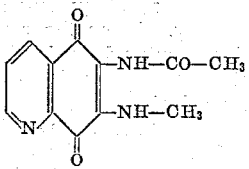

Methylamine was passed into a solution of 12 grams of 6-acetamino-7-chloro-5,8-quinolinequinone in 60 cc. of nitrobenzene during a period of 75 minutes at a temperature of 140° C. Methyl ammonium chloride was precipitated from the resulting reaction mixture and separated in the heat by suction filtration. The mother liquor was then concentrated in vacuo to yield 4 grams of the desired product, 6-acetamino-7-methylamino-5,8-quinolinequinone. This product was separated in the form of small reddish-brown crystals which when crystallized from chlorobenzene, melted at 175° C.

*Example 6*

Preparation of the compound 6-acetamino-7-anilido-5,8-quinolinequinone, as represented by the formula:

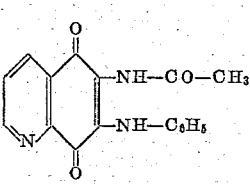

Four (4) grams of 6-acetamino-7-chloro-5,8-quinolinequinone and 3 cc. of aniline were heated to the boiling point in 30 cc. of alcohol for a period of 20 minutes. Upon cooling aniline hydrochloride was initially precipitated, and separated by suction filtration. Petroleum ether was then added to the mother liquor. After cooling and rubbing with petroleum ether there was obtained 3.5 grams of the desired product, 6-acetamino-7-anilido-5,8-quinolinequinone in the form of dark red crystals. Recrystallized from chlorobenzene, this product melted at 195° C.

*Example 7*

Preparation of the compound 6-acetamino-7-anilino-5,8-quinolinequinone, as represented by the formula:

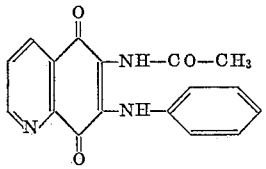

To 2.3 grams of 6-acetamino-7-methoxy-5,8-quinolinequinone were added 10 cc. of alcohol and 1 gram of aniline; and the whole was heated for a period of 10 minutes under refluxing conditions. After cooling and rubbing with petroleum ether small pasty red crystals separated out. These crystals were recrystallized from toluene to yield 2.1 grams of 6-acetamino-7-anilino-5,8-quinolinequinone which melted at 194° C.–196° C.

The 6-acetamino-7-methoxy-5,8-quinolinequinone was obtained initially by reaction of 6-acetamino-7-chloro-5,8-quinolinequinone with sodium methoxide. An alternative method employed for the preparation of 6-acetamino-7-methoxy-5,8-quinolinequinone was by methylation of 6-acetamino-7-hydroxy-5,8-quinolinequinone with diazomethane. The product when obtained, was in the form of yellow crystals which, recrystallized from toluene (or xylene), melted at 178° C.

*Example 8*

Preparation of the compound 6-propionylamino-7-amino-5,8-quinolinequinone as represented by the formula:

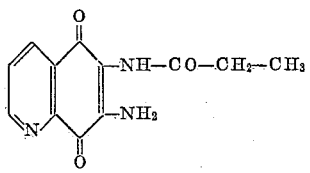

Twenty-six and four tenths (26.4) grams of 6-propionylamino-7-chloro-5,8-quinolinequinone in 150 cc. of nitrobenzene were heated while passing dry ammonia thereinto at a temperature of 140° C. to 150° C. for a period of 1½ hours. The reaction mixture was then filtered while still hot. From the resulting filtrate crimson-red crystals separated which, upon recrystallization from 1,2-dichlorobenzene, melted at 215° C. to 216° C. The yield of product, 6-propionylamino-7-amino-5,8-quinolinequinone, amounted to 14 grams.

*Example 9*

Preparation of the compound 2-furyl-8-aza-(lin. naphthimidazole)-4,9-quinone as represented by the formula:

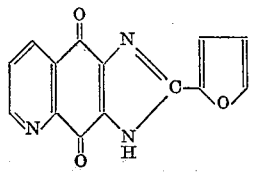

Nineteen (19) grams of 6,7-diamino-5,8-quinolinequinone in 150 cc. of water was heated with 10 grams of furfuraldehyde and 30 cc. of glacial acetic acid for 30 minutes under refluxing conditions. After cooling, the reaction product was filtered under suction, washed with water, and dried at 100° C.; thus causing it to change its color to a reddish-orange. For its purification this product, 8-aza-2-(2'-furyl)-(lin. naphthimidazole)-4,9-quinone, was recrystallized from nitrobenzene.

*Example 10*

Preparation of the compound 2-(4'-pyridyl)-8-aza-(lin. naphthimidazole)-4,9-quinone, as represented by the formula:

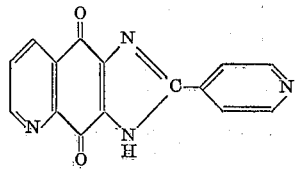

Sixteen (16) grams of 6,7-diamino-5,8-quinolinequinone in 120 cc. of water were heated for a period of one hour under reflux conditions with 9 grams of pyridine-4-aldehyde and 30 cc. of glacial acetic acid. The reaction product was allowed to cool, and was then subjected to suction filtration and dried at 200° C. The originally red crystals assumed a yellow coloration. These crystals were purified by recrystallization from N,N-dimethyl formamide to yield 14 grams of 2-(4'-pyridyl)-8-aza-(lin. naphthimidazole)-4,9-quinone as yellow crystals having a melting point of 360° C. (decomposition).

*Example 11*

Preparation of the compound 2-phenyl-8-aza-(lin. naphthimidazole)-4,9-quinone as represented by the formula:

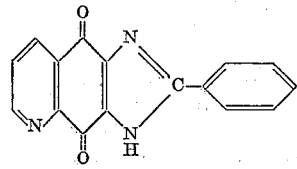

Thirty-three (33) grams of 6,7-diamino-5,8-quinolinequinone, 240 cc. of water, 19 grams of benzaldehyde and 60 cc. of glacial acetic acid were mixed with agitation under refluxing conditions for 2 hours. After cooling, the reaction product was subjected to suction filtration, washed with water and alcohol and dried at 120° C. For its purification, the crude brownish-yellow product, in amount 30 grams, was recrystallized from N,N-dimethyl formamide. There resulted a yield of 24 grams of 2-phenyl-8-aza-(lin. naphthimidazole)-4,9-quinone in the form of small yellow crystals, with a melting point of in excess of about 360° C. (decomposition). At temperatures above 300° C. the color of the product darkened.

*Example 12*

Preparation of the compound 2-(2'-hydroxy-3'-methoxyphenyl)-7-methyl-8-aza-(lin. naphthimidazole) - 4,9-quinone as represented by the formula:

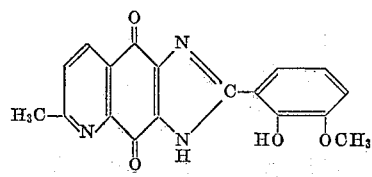

To a mixture composed of 40.6 grams of 6,7-diamino-5,8-quinaldinequinone, 70 cc. of glacial acetic acid and 300 cc. of water was added a solution of 31 grams of o-vanillin in 100 cc. of alcohol. The entire mixture was then heated for 2 hours under refluxing conditions with agitation. After cooling, the reaction product was subjected to suction filtration, dried at 120° C. and for the purpose of purification recrystallized from dimethylsulfoxide. There was yielded 33 grams of orange-colored 2-(2'-hydroxy-3'-methoxyphenyl)-7-methyl - 8 - aza - (lin. naphthimidazole)-4,9-quinone, having a melting point of 327° C. (decomposition).

Example 13

Preparation of the compound 2-methyl-8-aza-(lin. naphthimidazole)-4,9-quinone as represented by the formula:

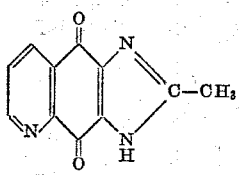

To 4 grams of 6-acetamino-7-amino-5,8-quinolinequinone in 160 cc. of hot alcohol were added 20 cc. of a 2 N-caustic soda solution and the whole heated to boiling for 20 minutes. The reaction product was next poured into 500 cc. of ice water and 20 cc. of dilute hydrochloric acid, and the precipitated yellowish-brown 2-methyl-8-aza-(lin. naphthimidazole)-4,9-quinone isolated by suction filtration. After recrystallization from N,N-dimethylformamide there was obtained 2.5 grams of yellowish-brown crystals which underwent decomposition above 360° C.

Example 14

Preparation of the compound 1-phenyl-2-methyl-8-aza-(lin. naphthimidazole)-4,9-quinone as represented by the formula:

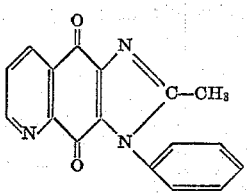

Sixteen (16) grams of 6-acetamino-7-anilino-5,8-quinolinequinone were heated to a boiling temperature in 100 cc. of alcohol and 30 cc. of a 10 percent solution of sodium hydroxide until the red color of the solution was changed to a yellowish-brown. After cooling, the pH was adjusted to 5-6 by means of dilute hydrochloric acid, and the yellow crystalline 1-phenyl-2-methyl-(lin. naphthimidazole)-4,9-quinone product was isolated by suction filtration. After drying and recrystallization from 1,2,4-trichlorobenzene there was obtained 14 grams of the desired yellow crystalline product which decomposed above 275° C.

Example 15

Preparation of the compound 1-phenyl-2-ethyl-8-aza-(lin. naphthimidazole)-4,9-quinone, as represented by the formula:

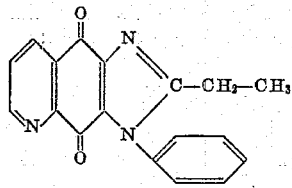

Fourteen (14) grams of 6-propionylamino-7-chloro-5,8-quinolinequinone were heated to boiling in 100 cc. of alcohol with 10 cc. of aniline for a period of 20 minutes. Thereupon, a 10 percent aqueous solution of sodium hydroxide was added thereto and heating continued until the red color which had appeared initially had disappeared. After cooling, the pH was adjusted to 5-6, and the pale yellow, glistening crystals of the desired product, were separated by suction filtration. After recrystallization of this product from 1,2-dichlorobenzene there was obtained 12 grams of 1-phenyl-2-ethyl-8-aza-(lin. naphthimidazole)4,9-quinone, having a melting point of 282° C. (decomposition).

Example 16

Preparation of the compound 1-(2'-methoxy-phenyl)-2,7-dimethyl-8-aza-(lin. naphthimidazole)-4,9-quinone as represented by the formula:

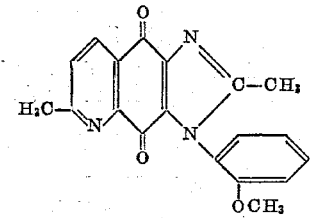

In a manner analogous to that described in Example 15 above, and substituting 6-acetamino-7-chloro-5,8-quinaldinequinone and 2-amino-anisole for 6-propionyl-amino-7-chloro-5,8-quinolinequinone and aniline respectively, there was obtained after recrystallization from pyridine, 1-(2'-methoxy-phenyl)-2,7-dimethyl-8-aza-(lin. naphthimidazole)-4,9-quinone with a decomposition point of 270° C.

Example 17

Preparation of the compound 1-(4'-dimethylamino-phenyl)-2-methyl-8-aza-(lin. naphthimidazole)-4,9-quinone as represented by the formula:

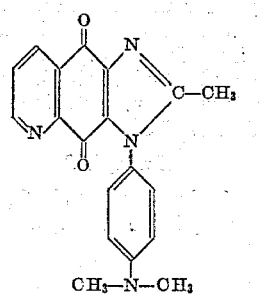

By a procedure analogous to that described in Example 15, substituting 6-acetamino-7-chloro-5,8-quinolinequinone and p-dimethylaminoaniline for 6-propionyl-amino-7-chloro-5,8-quinaldinequinone and analine, respectively, therein recited, there was obtained after recrystallization from pyridine the desired product, 1-(4'-dimethyl-aminophenyl)-2-methyl-8-aza-(lin. naphthimidazole)-4,9-quinone having a decomposition point of 306° C.

Example 18

Preparation of the compound 1-(2'-methoxyphenyl)-2-methyl-8-aza-(lin. naphthimidazole)-4,9-quinone as represented by the formula:

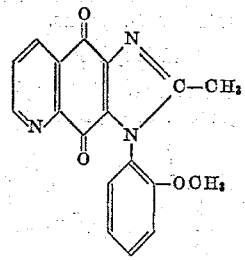

In a procedure similar to that described in Example 15 above, substituting 6-acetamino-7-chloro-5,8-quinolinequinone and 2-aminoanisole for the 6-propionyl-amino-7-chloro-5,8-quinaldinequinone and aniline respectively, therein recited, there was obtained, after recrystallization from chlorobenzene, 1-(2'-methoxyphenyl)-2-methyl-8-aza-(lin. naphthimidazole)-4,9-quinone having a decomposition point of 270° C.

Example 19

Preparation of the compound 1-(4'-dimethylaminophenyl)-2-ethyl-8-aza - (lin. naphthimidazole) - 4,9 - quinone as represented by the formula:

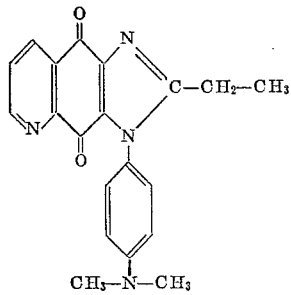

Substituting 6 - propionyl - 7 - chloro - 5,8 - quinolinequinone and p-dimethylaminoaniline for the quinone and aniline reactants in the procedure described in Example 15, there was obtained after recrystallization from chlorobenzene, 1-(4'-dimethylaminophenyl)-2-ethyl-8-aza-(lin. naphthimidazole)-4,9-quinone in the form of red crystals having a decomposition point of 329° C. to 331° C.

What is claimed is:
1. A compound of the formula:

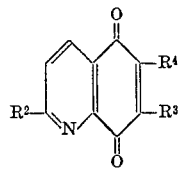

wherein $R^2$ is a member selected from the group consisting of a hydrogen atom and lower alkyl; $R^3$ is a member selected from the group consisting of amino, alkylamino wherein the alkyl moiety is lower alkyl, alkoxy of 1 to 6 carbon atoms, and anilino; and $R^4$ is a member selected from the group consisting of amino, acetamino, and propionylamino.
2. 6,7-diamino-5,8-quinolinequinone.
3. 6,7-diamino-5,8-quinaldinequinone.
4. 6-acetamino-7-amino-5,8-quinolinequinone.
5. 6-acetamino-7-methylamino-5,8-quinolinequinone.
6. 6-acetamino-7-anilino-5,8-quinolinequinone.
7. 6-acetamino-7-methoxy-5,8-quinolinequinone.
8. 6-propionylamino-7-amino-5,8-quinolinequinone.

References Cited in the file of this patent

Elsevier: Encylopedia of Organic Chemistry, Series III, vol. 12b, p. 2998 (1952).